United States Patent [19]
Jenkin

[11] 3,791,012
[45] Feb. 12, 1974

[54] TRACTION APPLYING TOOL
[75] Inventor: Arthur S. Jenkin, Peapack, N.J.
[73] Assignee: Komline-Sanderson Engineering Corporation, Peapack, N.J.
[22] Filed: May 8, 1972
[21] Appl. No.: 251,425

[52] U.S. Cl.................. 29/254, 81/52.35, 145/30.5, 173/91
[51] Int. Cl........................................... B23p 19/04
[58] Field of Search ............ 29/254; 81/52.3, 52.35; 173/91; 145/30.5

[56] References Cited
UNITED STATES PATENTS
| | | | |
|---|---|---|---|
| 1,492,462 | 4/1924 | Hoy | 29/254 |
| 2,514,130 | 7/1950 | Jones | 81/370 X |
| 1,747,053 | 2/1930 | Colerick | 29/254 |

Primary Examiner—Othell M. Simpson
Assistant Examiner—Harold P. Smith, Jr.

[57] ABSTRACT

A workpiece to which traction is to be applied is firmly held by a gripping device to which is anchored one end of a rectilinear guide having a free end directed away from the workpiece. An impact member of high inertia is slidably disposed on the guide for rapid movement toward an impacting engagement with an abutment carried by the guide adjacent its free end, whereby the resulting tensional forces in the form of a sudden impulse are transmitted through the gripping device to the workpiece for use, for instance, in withdrawing the workpiece from a member in which it is firmly anchored or embedded.

The impulse applying means is combined with the gripping device in such a manner to avoid transmitting the impulses to the workpiece through the toggle linkage or other locking means which secures the jaws of the device in gripping engagement with the workpiece, whereby to avoid loosening of the jaws and/or damage to the said locking means.

1 Claim, 1 Drawing Figure

Patented Feb. 12, 1974
3,791,012
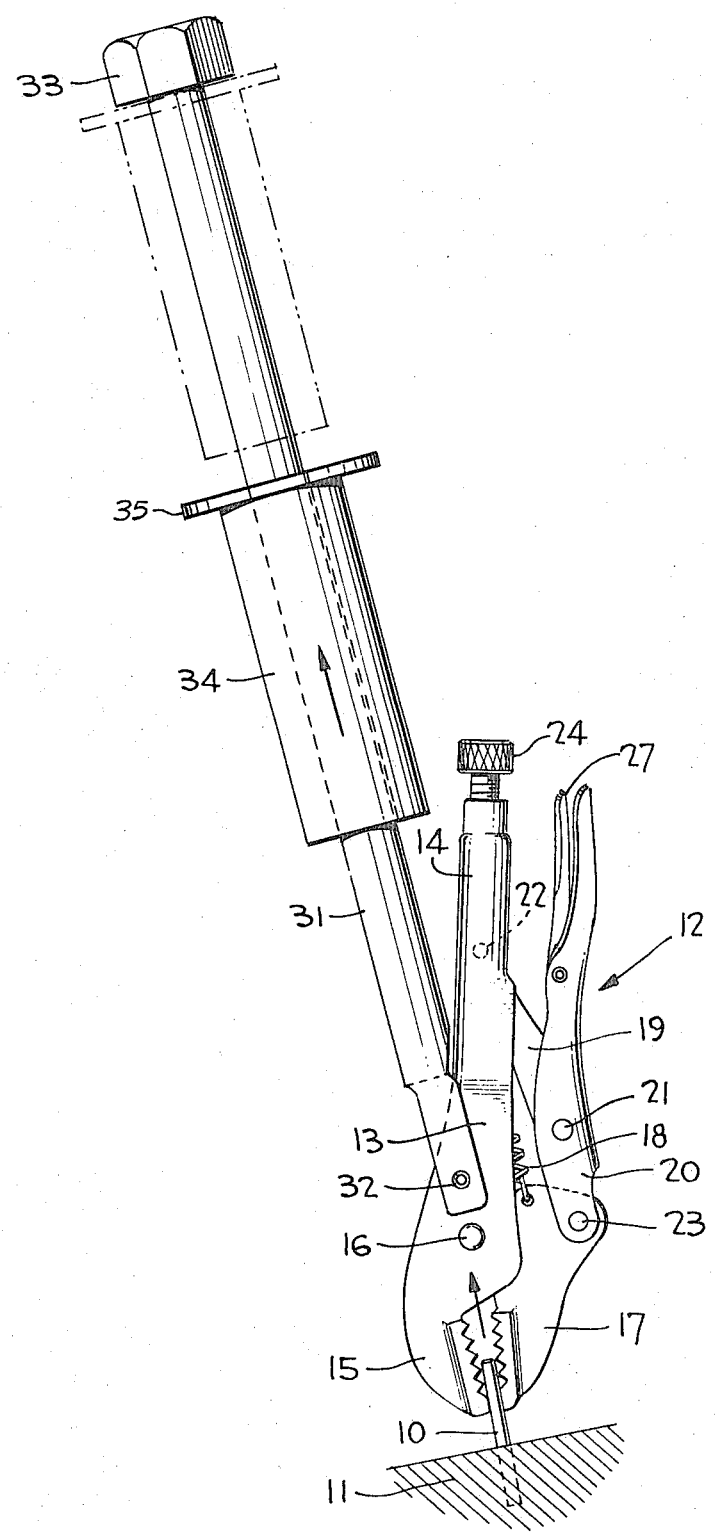

TRACTION APPLYING TOOL

This invention relates to an improved traction applying tool such as is particularly adapted for removing tines from the tine bars of belt discharge type vacuum filter units with minimum effort and expenditure of time and with minimum risk of damage to the tine bars.

In certain belt discharge vacuum type filter units of the class in which the filter media is in the form of a belt comprising a plurality of parallel contiguous spring coils, a portion of which are led from the filter drum in relatively spaced relation around a discharge roll, it is customary to facilitate the discharge of filter cake from the last mentioned coils by means of a series of tines supported by a tine bar, with the free ends of the tines directed between the relatively spaced coil springs and into near proximity with the surface of the discharge roll.

It is necessary, from time to time, to replace certain of the tines as they become worn or bent. Due to the fact that the tines, in addition to being unheaded, are quite strongly and firmly embedded in the tine bar, it has been difficult in the past, to extract the said tines without undue expenditure of time and difficulty, as well as risk of damage to the tine bar and adjacent tines.

Although the present invention has been conceived primarily for the purpose of facilitating the extraction of such tines, it is also manifestly capable of more general use in applying a lengthwise traction or tension force, in the form of directionally oriented force impulses, to various elongated articles or workpieces.

In accordance with the invention, there is provided a suitable device for firmly gripping the workpiece and to such device, there is anchored one end of a guide having an inertia or impact member freely slidable thereon for impacting engagement against an abutment fixed to the guide adjacent its free end remote from the gripping device, so that the impact member may be employed to impart one or more blows to the abutment for transmission by tension through the guide and gripping device to the workpiece in a predetermined direction corresponding to the lengthwise orientation of the elongated guide.

In a preferred form of the invention, the work gripping device is of a type such as is disclosed in the U.S. Pat. No. 2,514,130 to Jones, in which one of the work gripping jaws and its associated handle are fixedly interconnected as part of a stationary clamp member, while a movable jaw is pivotally connected to the said member for swinging movement toward and away from the fixed jaw, and is releasably locked in a predetermined relation to the fixed jaw and in clamping engagement with the workpiece, by means of a toggle linkage in which the remote ends of the links are respectively pivotally connected to the movable jaw and to the said member at locations eccentric to the pivotal connection between the movable jaw and said member.

In accordance with the invention, the aforesaid guide is anchored to the aforesaid stationary clamp member at a location such that the impact forces delivered to said gripping or clamping device will not be transmitted through the locking or toggle linkage and thus will neither tend to loosen the grip of the device on the workpiece, nor damage the said linkage.

In the accompanying drawing, which illustrates the preferred embodiment of the traction applying tool of the invention, the FIGURE illustrates a front elevation of the said tool, illustrating the impact member in full lines at substantially the commencement of its operative stroke and in broken lines at the completion thereof.

Referring now in details to the accompanying drawing, the reference character 10 designates one of a series of tines such as are embedded in a tine bar 11, in accordance with conventional practice, to be supported by the tine bar with the respective tines projecting between relatively spaced coil springs (not shown) of a coil spring filter media and into near engagement with the discharge roll around which said coil springs pass during use on a convention belt-type discharge vacuum filter unit in which the belt comprises a plurality of such coil springs, as exemplified in various of the prior U. S. Pat. Nos. 2,583,698; 2,652,927 and 2,699,260 of Thomas R. Komline.

The improved traction applying tool of the present invention is shown in its preferred use in pulling or extracting the said tine 10 from the tine bar 11. As one of the elements of the novel combination herein disclosed and claimed, there is employed a gripping device, generally designated by the reference numeral 12, to be applied to a selected tine 10 in gripping engagement therewith in the manner illustrated.

The gripping device 12 herein specifically illustrated is of conventional construction, such as exemplified in the U.S. Pat. No. 2,514,130 of July 4, 1950 to Jones. The device comprises a stationary clamping or gripping member 13 including a rigid handle or lever 14 to one end of which is affixed a stationary gripping or clamping jaw 15. Pivotally attached to the member 13 at 16 is the movable jaw 17 which preferably is normally resiliently biased away from the jaw 15 by a spring 18, but which may be securely held or locked by means of a suitable toggle linkage to secure and maintain the device in gripping engagement with a tine such as 10. The toggle linkage comprises the rigid toggle links 19 and 20, pivotally interconnected by the toggle knee 21, with the relatively remote ends of the links pivotally connected respectively to the member 13 at 22 and to the movable jaw 17 at 23, it being noted that both pivotal connections 22 and 23 are spaced from and eccentric to the jaw pivot 16 so that movement of the toggle knee 21 toward the member past a dead center position between the pivots 22 and 23 will urge the jaw 17 about the pivot 16 and toward the jaw 15 to maintain the said jaws 15 and 17 in firm gripping engagement with the tine 10.

The pivotal connection 22 is carried at the inner end of a screw 24 for adjustment lengthwise of the handle or lever 14, in a manner more fully disclosed in the said Jones patent for suitably varying the spacing between the jaws 15 and 17 in their relatively closed or gripping position, whereby to adapt them for use with workpieces of varying sizes and diameters. Also, as disclosed in the Jones patent, release of the gripping device from the workpiece may be facilitated by use of a releasing lever 27.

In combination with the gripping device 12, the invention comprises an impact producing means or mechanism comprising a guide here illustrated as an elongated rigid rod 31 having a bifurcated lower end receiving and anchored at 32 to the stationary clamp or gripping member 13. At its free end, the guide 31 is formed with a radial enlargement or abutment 33. An impact member or weight 34 here exemplified by a generally cylindrical tubular metal sleeve of considerable mass and inertia, is freely slidable on the guide 31 between the gripping device 12 and the abutment 33 at the free end of the guide for impacting engagement with the abutment 33. Abutment 33 may conveniently comprise a conventional nut threaded onto the guide 31.

The weight or impact member 34 is proportioned for convenient reception in the user's hand whereby it may be slid up and down the guide 31 to impact against the abutment 33 as many times as may be necessary to withdraw the tine 10 from the tine bar 11.

Preferably, the impact member or weight 34 has a radial flange, here defined by a relatively larger diameter washer 35, securd to its upper or outer axial end to provide an abutment or stop against which the user's hand may rest and prevent the user's fingers from being pinched between the weight 34 and its cooperating abutment 33, as well as to better distribute the impact which occurs between the members 33 and 34.

It is to be observed that the connection 32 by which the guide 31 is anchored to the stationary clamping or gripping member 13 is preferably in the form of a pivot, whereby the guide 31 is swingable or adjustable about an axis parallel to the axis of the jaw pivot 16. Such pivotal connection is advantageous as facilitating application of the device to a preselected tine or tines in more or less inaccessible locations. Moreover, the resulting angular adjustability of the guide 31, and thus of the direction of the force of impact, may be selected where desired for alignment in a direction at somewhat of an angle to the length of the tine or other workpiece, so that the impacting force or traction may be applied substantially in alignment with the root of the tine, even though the outer end portion thereof, gripped between the jaws 15 and 17, is bent.

In the use of the invention, which is believed to be apparent from the foregoing disclosure, the gripping member 12 is applied to the particular tine 10 to be withdrawn, in the manner illustrated in the drawing and as is fully and clearly disclosed in the aforesaid Jones U. S. Pat. No. 2,514,130. After the gripping device is thus applied to and locked in gripping relation on the preselected tine, the workman grasps the impact weight 34 and, by manipulating the weight, may adjust the guide 31 about its pivot 32 into substantial alignment with the root of the tine 10, whereupon the weight of member 34 is manually propelled to impact it against the abutment 33 in such number of strokes as may be necessary to effect complete withdrawal of the tine 10. The impacting force manifestly will be transmitted as tension through the guide 31, the anchor point or pivot 32 and the fixed clamping or gripping member 13, the jaw pivot 16 and jaws 15 and 17, to the tine 10, in a manner such as to completely bypass the toggle linkage or locking means 19 and 20 so as not to disturb the latter or to loosen in any way the grip of the jaws 15 and 17 on the tine.

It will be readily apparent that the device of the invention is quite simple and sturdy in construction and that its mode of use will normally be made readily apparent to the workman merely by inspection of the device.

While only the preferred embodiment of the invention is illustrated in the accompanying drawing, it will be readily apparent that various modifications may be made without departing from the spirit and scope of the invention as defined in the accompanying claims.

I claim:

1. A traction applying tool comprising in combination a stationary clamp member, including a jaw and a handle rigidly connected thereto, a movable jaw pivotally connected to said member for swinging movement toward and away from said first jaw for gripping an object between said jaws, and a toggle linkage extending between and pivotally connected to said handle and said movable jaw respectively at locations eccentric to the pivotal connection between said member and the movable jaw, for selectively locking said jaws in gripping engagement with a workpiece; in combination with a rectilinear guide having one end anchored to said stationary clamp member and the other end free, said free end being on the side of said handle remote from said toggle linkage, an abutment on said guide spaced from said one end, and an impact member freely slidable on said guide between said one end and said abutment for impacting engagement with said abutment to urge said jaws and said workpiece in a direction toward the free end of said guide, said one end of the guide being pivotally connected to said stationary clamp member for swinging movement relative thereto, about an axis parallel to the axis of said pivotal connection between the said member and the movable jaw.

* * * * *